C. A. BACKSTROM.
ELASTIC FLUID TURBINE.
APPLICATION FILED OCT. 30, 1909.
974,457.
Patented Nov. 1, 1910.
3 SHEETS—SHEET 2.
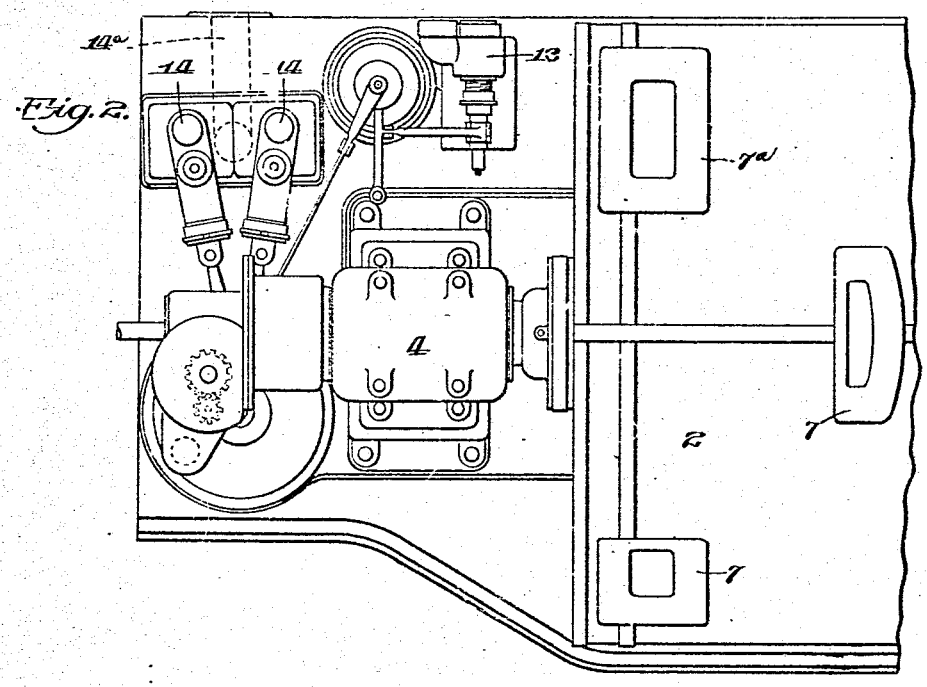
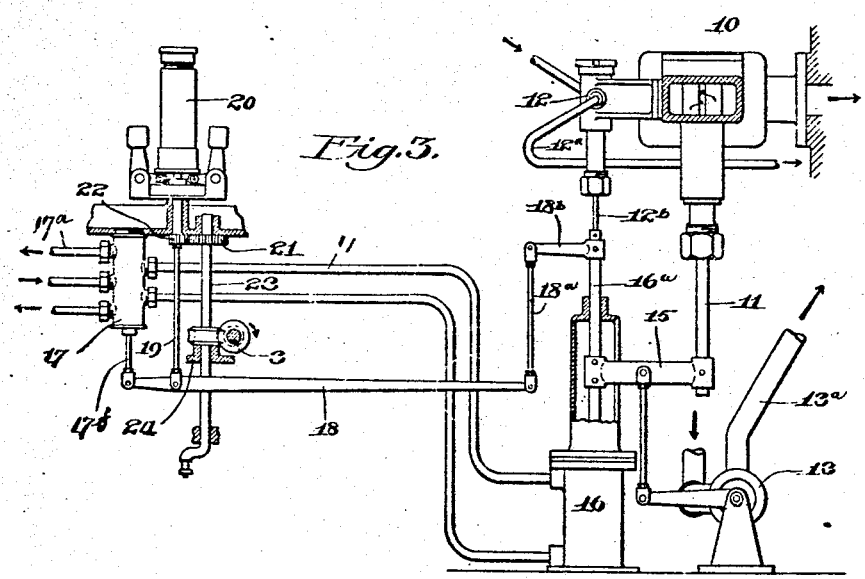
WITNESSES:
INVENTOR
Charles A. Backstrom
BY
ATTORNEY.

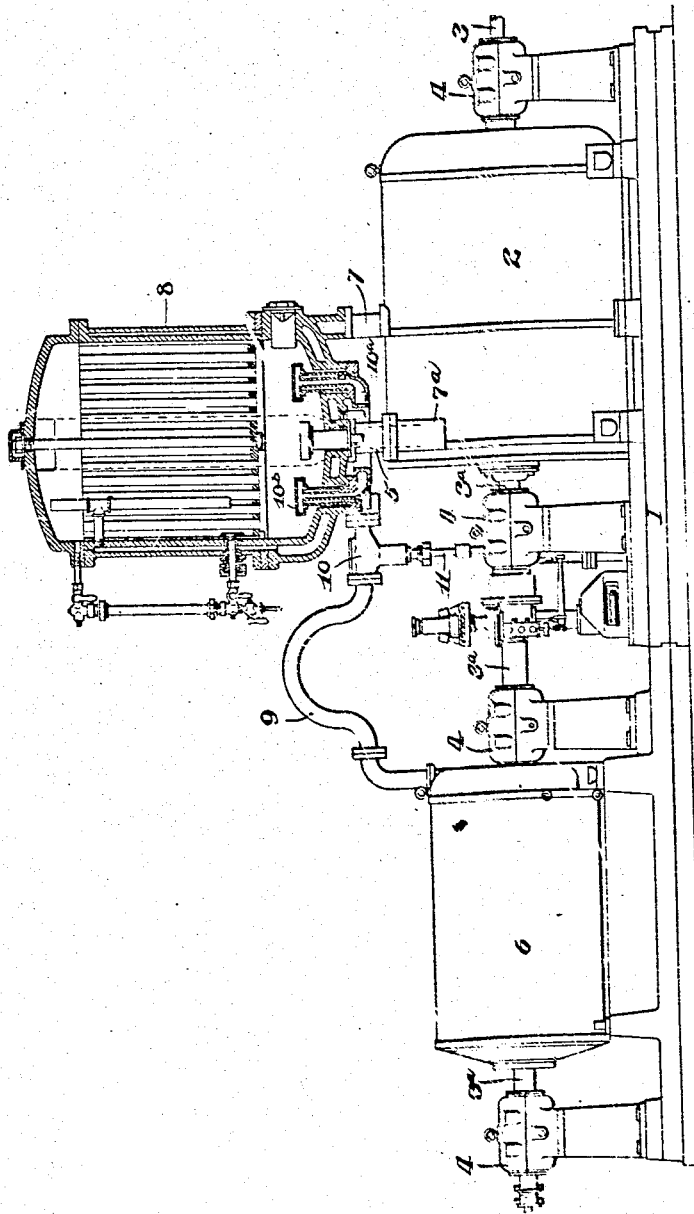

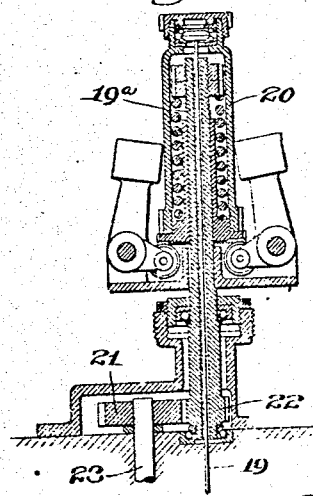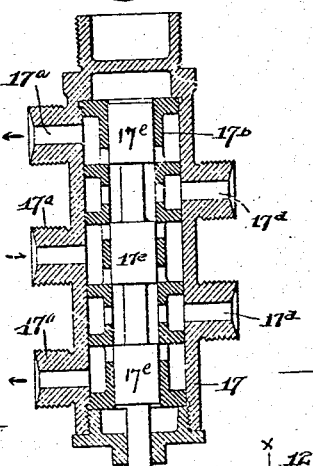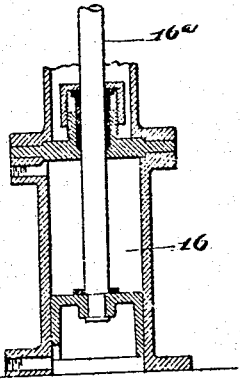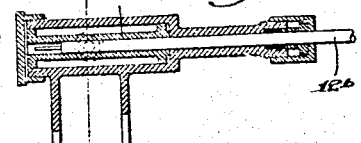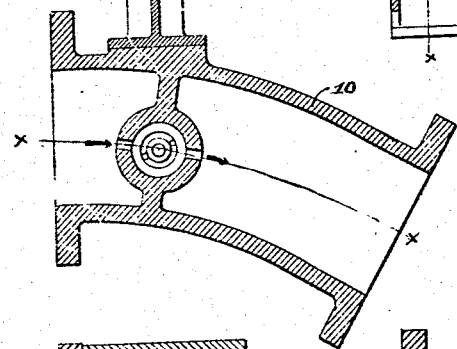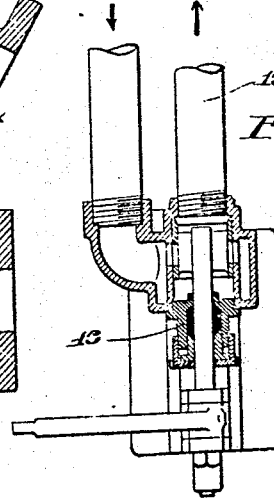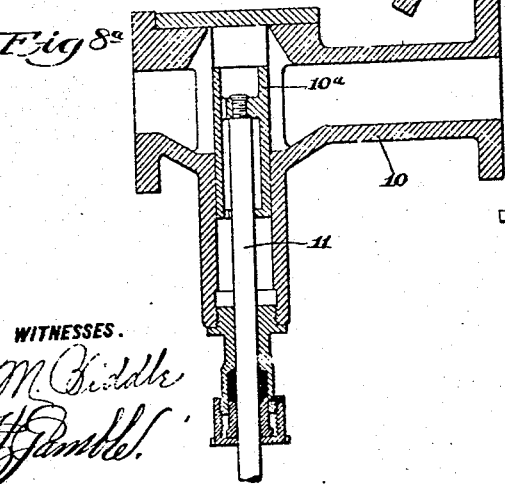

UNITED STATES PATENT OFFICE.

CHARLES A. BACKSTROM, OF PHILADELPHIA, PENNSYLVANIA, ASSIGNOR TO INTERNATIONAL POWER GENERATOR COMPANY, A CORPORATION OF DELAWARE.

ELASTIC-FLUID TURBINE.

974,457.

Specification of Letters Patent.

Patented Nov. 1, 1910.

Application filed October 30, 1909. Serial No. 525,441.

*To all whom it may concern:*

Be it known that I, CHARLES A. BACKSTROM, citizen of the United States, residing in the city of Philadelphia, State of Pennsylvania, have invented certain new and useful Improvements in Elastic-Fluid Turbines, of which the following is a full, clear, and exact description, reference being had to the accompanying drawings, forming a part of this specification.

The invention about to be described relates to elastic-fluid turbines, speaking generally; but more specifically it comprises broadly a combination, including such an element, whereby the latter, in such combination, is operated by a mixture with steam, in suitable proportion, of other fluids or gases resulting as the products of combustion in a suitable generator, of a suitable fuel, such as hydrocarbon, and compressed air, delivered under governing mechanism, to the generator. The turbine so combined with and actuated by the means stated, I deem to be generically new, and to it I have given the title of multi-fluid turbine, as appropriately descriptive thereof.

The ultimate objects of the invention are primarily to increase the economy of operation of the ordinary steam turbine and to increase its efficiency, and incidentally to provide a turbine in which the governor element automatically controls the production of motive fluid in proportion to the load.

To these ends the invention, in the form in which I have reduced it to practice and shown it in the annexed drawings, consists of the combination with a suitable supporting and connecting bed-plate; of an elastic fluid turbine of any usual type, a gaseous fluid generator and mixer, an air-compressor supplying air thereto, water, fuel and air passages, with valves governing the same, means to actuate the said series of valves, and a governor controlling said valve-actuating means between the elements.

The invention further comprises detail features of the concrete device, including especially the governor element and its adjunctive parts, which latter I believe to be wholly new.

In the accompanying drawings illustrating my invention, Figure 1 is a side elevation, partly in section, of a device comprising in combined relation, the housing of a turbine with mountings for its shaft, an air-compressor, with mountings for its shaft, a governor device, with suitable valvular connections interposed between them, and a gaseous fluid generator and mixer suitably mounted above said elements and in appropriate relation to the turbine element. Fig. 2 is a plan view of the governor element and adjunctive parts, including the supports for the fluid generator and mixer over the turbine housing. Fig. 3 is an elevation, diagrammatic in character, of the governor, its driving shaft, the valve controlling a source of force such as oil under pressure, for supplying air from the compressor to the fluid generator, fuel to the generator, and water to the generator. Fig. 4 is a vertical sectional view of the centrifugal governor element; Fig. 5 is a like sectional view of the oil or liquid hydraulic controlling valve. Fig. 6 is a like view of the hydraulic cylinder whose piston rod, under control of the governor, controls the air fuel and water supply to the fluid generator. Fig. 7 is a central sectional view of the valve controlling the oil or other fuel supply. Fig. 8 is a section on the line $x$—$x$ of Fig. 7, superposed on a longitudinal section of the air-valve. Fig. 8$^a$ is a section of the air-valve taken on the curved line $x$—$x$ of Fig. 8; and Fig. 9 is a horizontal section of the water controlling valve.

Referring now to said drawings, 1 indicates a bed-plate of suitable construction to operatively unite and support the combined mechanisms; 2 indicates a turbine housing containing the usual elemental parts of an elastic fluid turbine, of any known type; 3 indicating its shaft and 3$^a$ the stationary protecting sleeves inside of which the shaft rotates; 4 are the bearings for such shaft, and 5 the inlet for the actuating fluid to the turbine. On the lefthand side of Fig. 1, the coupled section of the driving shaft 3, mounted in its bearings 4 on either side, is appropriately connected to drive the interiorly-contained mechanism of an air-compressor indicated at 6, which may be of any usual turbo type.

Appropriately above the turbine housing 2, by means, for example, of three bracket supports 7, 7$^a$, shown in plan view on righthand side of Fig. 2, is a fluid generator indicated at 8, the functions of which, in the combined mechanism, are to receive, in suitable proportions (automatically regulated by a governor mechanism hereinafter described) air and hydro-carbon or other fuel, to burn the same in a suitable burner, to make steam in a suitable boiler forming a part of such fluid generator, and to mix such steam with the gases resulting from the combustion of the fuel, delivering such admixed steam and products of combustion through a suitable passageway to the inlet 5 of the turbine.

While a different construction of fluid generator capable of performing the functions stated, may be substituted in the combination for the particular generator shown in section in Fig. 1 of the drawings, I prefer to use that, as the most effective known to me; and for a fuller description of it refer to my pending and allowed application of it, Serial No. 519,633 wherein it is fully shown and described.

A tubular connection 9 leads from the compressor 6 to the inlet of a distributer $9^a$, which is at the base of the generator 8 below the burners $10^b$ therein. Said tubular connection 9 is provided with a valve 10 interposed in its length and contiguous to the aforesaid inlet to the distributer; and the function of this valve is to control the amount of air admitted to the burners of the generator in proportion to the fuel admitted, such appropriate relative proportion being maintained automatically by the governor mechanism hereinafter described. Back of the air-valve 10, which has a balanced piston $10^a$ actuated through its stem 11, is a valve 12 controlling the tubular conduit $12^a$ of the hydro-carbon or other suitable fuel source of supply (see Fig. 3). Said valve 12 is actuated through its stem $12^b$. Contiguous to each of the same is arranged a rotary valve indicated at 13 controlling the supply of water through conduit $13^a$, the arrows indicating the inlet and discharge, the former making connection with any source of water supply and the latter leading to the suction end of the pumps 14 (Fig. 2) and thence to the fluid generator 8. The three valves 10, 12 and 13 are operated together through suitable link connections indicated at 15 by means of a hydraulic cylinder 16 and its piston rod $16^a$ (see also Fig. 6).

By reference to the lefthand side of Fig. 3 will be seen a valve 17 (illustrated in detail in Fig. 5), which controls a plurality of pipes $17^a$ the central one of which leads to a constant source of force, such as oil under pressure. Said valve also controls a pair of pipes $17^d$ connecting with the hydraulic cylinder 16. The barrel or casing of said valve 17 is provided interiorly with an annularly-channeled and perforated bushing $17^b$, said channels and perforations forming passageways when brought into register, by the movement of the valve pistons $17^c$, to establish communication between the source of force and the hydraulic cylinder, on one side or the other, and actuate its piston. The other two of the three ports are, by the same movement of the valve, brought into appropriate communication with the opposite ports $17^d$ to discharge the oil on the opposite side of the piston in the hydraulic cylinder. Within the bushing $17^b$ is mounted and actuated the said valve 17, which consists of three pistons $17^c$ mounted in spaced relation, on the stem $17^t$. The latter (see Fig. 3) is connected, by means of the lever 18, and links $18^a$ and $18^b$ to the piston rod $16^a$ of the hydraulic cylinder 16. The said lever 18 is connected to a rod 19 leading directly to and actuated vertically by the governor mechanism shown in detail section in Fig. 4, and which is of the ordinary type of a centrifugal governor. Said rod 19 passes upward through a hollow rotatable governor-shaft $19^a$, on which latter is carried a gear 22, which meshes with a gear 21 on shaft 23 which drives the pumps 14; and on said shaft 23 is mounted a worm-gear 24 driven by a worm on the turbine shaft 3, see Fig. 3.

The operation of the device is as follows:—The fluid generator being put into action by means of air furnished from a storage tank, or otherwise, the motive fluid generated therein will be delivered to the turbine, the shaft of which puts into appropriate motion the air-compressor, the governor mechanism and the water feed pumps. When a change takes place in the speed or load of the turbine, the governor will, by means of the connecting actuating mechanism described, control the valve ports leading to the air, fuel and water sources of supply, and keep the speed normal. These results are effected because in the generator element the combustion of the fuel employed, preferably a hydro-carbon, takes place at a pressure above the normal working pressure of the turbine; and the combustion gases as also the vapor generated, mix in their passage to and through the tubular connection with the turbine and supply thereto a plurality of expansive motive fluids. Also because the admission of compressed air, fuel and water to the generator is automatically regulated by suitable valvular devices to meet the load requirements of the turbine, and controlling such valvular devices to keep the fluids generated proportional to the load of the turbine. The same operative relation exists between the turbine and the turbo compressor in respect of the latter's absorption of power from the former, indicated by the volume of air compressed and delivered; and because of that, as also of the governor mechanism actuated by the turbine, the same relation above stated also exists as between the compressor and the generator in that the valvular device, which regulates the volume of air delivered from the compressor to the generator, controlled in its action by the governor and its adjunctive parts, governs the absorption of power from the former to the latter.

Having thus described my invention, I claim as new and desire to secure by Letters Patent:—

1. The combination, constituting a multi-fluid turbine, of an elastic fluid turbine element, means to generate and deliver thereto a plurality of expansive motive fluids, means, provided with valvular devices, to supply materials to said generator; and a governor adapted to operate as a speed responsive device driven by the turbine, with connecting actuating mechanism, controlling said valvular devices.

2. In a multi-fluid turbine comprising a turbine element, a generator adapted to supply thereto a plurality of expansive motive fluids, and a turbo compressor driven directly by the turbine shaft, with a valvular device controlling the admission of air therefrom to the generator, of a valvular device controlling a source of supply of water, and another valvular device controlling a source of supply of fuel, delivered to the generator, a governor adapted to operate as a speed responsive device driven by the turbine, and connecting mechanism controlled by said governor and actuating said series of valvular devices.

3. In a multi-fluid turbine, a turbine element, means to generate and supply thereto a plurality of expansive motive fluids, a turbo compressor, a valvular device between the same and the generator, means to deliver water to the generator, a valvular device between said elements, a source of supply of fuel to the generator with interposed controlling valvular device, a series of levers actuating said series of valvular devices, a hydraulic cylinder whose piston rod actuates said levers, a valve mechanism governing the supply of fluid under pressure to actuate said hydraulic cylinder, and a governor driven from the turbine shaft, with interposed connecting mechanism actuating said last mentioned valve mechanism under regulative control of the governor.

In testimony whereof, I have hereunto affixed my signature this 25th day of October A. D. 1909.

CHARLES A. BACKSTROM.

Witnesses:
A. M. BIDDLE,
R. A. DUNLAP.